(12) United States Patent
Landt et al.

(10) Patent No.: US 9,220,283 B2
(45) Date of Patent: Dec. 29, 2015

(54) DEVICE AND METHOD FOR COMPLETELY SEPARATING FROM THE CARCASS OF A GUTTED POULTRY BODY BREAST FILLETS THAT HAVE ALREADY BEEN PARTIALLY DETACHED FROM THE CARCASS

(71) Applicant: NORDISCHER MASCHINENBAU RUD. BAADER GMBH + CO. KG, Lübeck (DE)

(72) Inventors: Andreas Landt, Lübeck (DE); Reinhard Evers, Stockelsdorf (DE)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 0 days.

(21) Appl. No.: 14/367,955

(22) PCT Filed: Dec. 12, 2012

(86) PCT No.: PCT/EP2012/075181
§ 371 (c)(1),
(2) Date: Jun. 23, 2014

(87) PCT Pub. No.: WO2013/092330
PCT Pub. Date: Jun. 27, 2013

(65) Prior Publication Data
US 2014/0349558 A1 Nov. 27, 2014

(30) Foreign Application Priority Data
Dec. 23, 2011 (EP) .................................... 11195551

(51) Int. Cl.
*A22C 17/00* (2006.01)
*A22C 21/00* (2006.01)

(52) U.S. Cl.
CPC ........... *A22C 21/003* (2013.01); *A22C 21/0069* (2013.01)

(58) Field of Classification Search
USPC ......... 452/135, 136, 149–155, 160–163, 165, 452/177–179
See application file for complete search history.

(56) References Cited

U.S. PATENT DOCUMENTS

| 4,373,232 A | 2/1983 | Harding et al. |
| 4,564,976 A | 1/1986 | Beech et al. |

(Continued)

FOREIGN PATENT DOCUMENTS

| CN | 1213664 C | 8/2005 |
| EP | 0183986 A1 | 6/1986 |

(Continued)

OTHER PUBLICATIONS

International Search Report; PCT/EP2012/075181, International File Date: Dec. 12, 2012; Nordischer Maschinenbau Rud. Baader GmbH + Co. KG; 4 pgs.

(Continued)

*Primary Examiner* — Richard Price, Jr.
(74) *Attorney, Agent, or Firm* — Sunstone IP

(57) ABSTRACT

The invention relates to an apparatus for completely separating from the carcass of a gutted poultry body breast fillets that have already been partially detached from the carcass, comprising a pair of separating means for separating the breast fillets hanging down on both sides of the breast bone of the carcass from the breast bone as well as guiding means for guiding the carcass in the direction of the two separating means arranged at a distance from one another, wherein the guiding means comprises two guiding elements lying next to one another and at a distance from one another, which between them form a gap which is directed in the transport direction T of the poultry bodies for receiving and guiding the breast bone of the carcass, and wherein the separating means enter this gap from below in such a way that the separating means for separating the breast fillets from the breast bone protrude upwards beyond the guiding means in the direction of the carcass, which is distinguished by the fact that the guiding elements are pivotable out of a guiding position forming the gap into a waiting position increasing the distance A to the separating means and vice versa and in that a spreading element for spreading the breast fillets away from the breast bone during the separating operation is provided. Furthermore, the invention relates to a corresponding method.

20 Claims, 6 Drawing Sheets

(56) References Cited

U.S. PATENT DOCUMENTS

Figure 1:
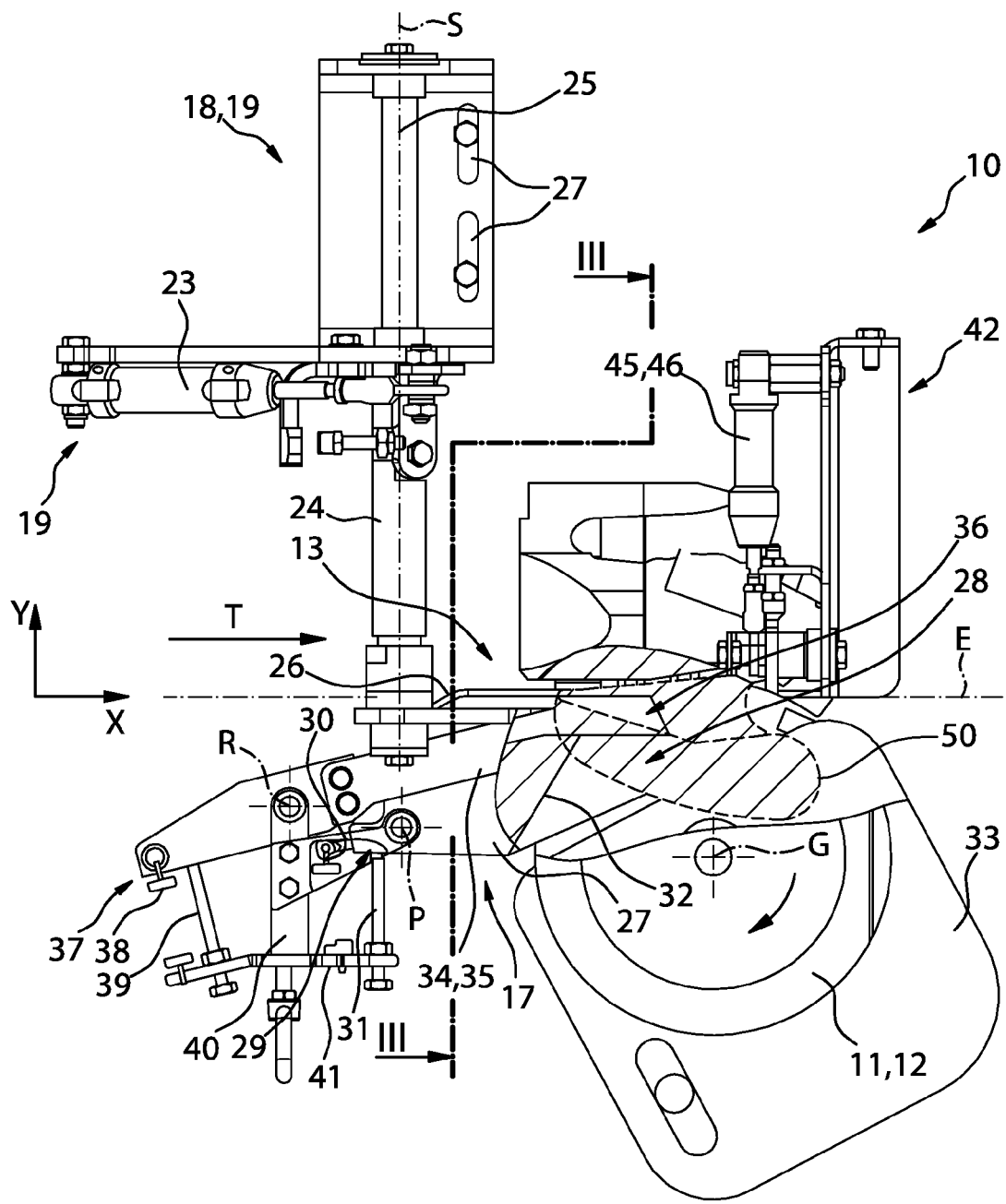

| | | | |
|---|---|---|---|
| 4,688,297 A | 8/1987 | Bartels | |
| 4,920,610 A * | 5/1990 | Callsen et al. | 452/169 |
| 4,993,114 A | 2/1991 | Meyer et al. | |
| 5,069,652 A | 12/1991 | Hazenbroek | |
| 5,618,230 A * | 4/1997 | Bargele et al. | 452/169 |
| 6,007,416 A * | 12/1999 | Janssen et al. | 452/135 |
| 6,736,717 B1 * | 5/2004 | Annema et al. | 452/172 |
| 6,837,782 B2 * | 1/2005 | Hetterscheid et al. | 452/179 |
| 6,921,632 B2 * | 7/2005 | Lim et al. | 435/1.1 |
| 8,308,535 B2 * | 11/2012 | De Vos et al. | 452/136 |
| 8,348,729 B2 * | 1/2013 | Janssen et al. | 452/136 |
| 8,435,100 B2 * | 5/2013 | De Vos et al. | 452/136 |
| 8,460,071 B2 * | 6/2013 | Masseilot | 451/524 |
| 2004/0132395 A1 | 7/2004 | Van Den Nieuwelaar et al. | |
| 2006/0099899 A1 | 5/2006 | Hazenbroek et al. | |
| 2006/0099900 A1 | 5/2006 | Van Den Nieuwelaar et al. | |
| 2007/0202789 A1 | 8/2007 | Van Den Nieuwelaar et al. | |
| 2008/0254728 A1 | 10/2008 | van den Nieuwelaar et al. | |
| 2009/0285972 A1 | 11/2009 | Andriessen | |

FOREIGN PATENT DOCUMENTS

| | | |
|---|---|---|
| EP | 1462007 B1 | 7/2005 |
| EP | 1654932 A2 | 5/2006 |
| EP | 2332419 A2 | 6/2011 |
| EP | 2332420 A2 | 6/2011 |
| EP | 2347657 A2 | 7/2011 |
| SU | 1812946 A3 | 4/1993 |
| WO | 2007067052 A2 | 6/2007 |

OTHER PUBLICATIONS

Notice of Opposition to a European Patent dated Jul. 29, 2015 from European Patent No. EP2606735, published Jun. 26, 2013.

* cited by examiner

VI-VI

DEVICE AND METHOD FOR COMPLETELY SEPARATING FROM THE CARCASS OF A GUTTED POULTRY BODY BREAST FILLETS THAT HAVE ALREADY BEEN PARTIALLY DETACHED FROM THE CARCASS

CROSS-REFERENCE TO RELATED APPLICATIONS

This application claims priority to PCT/EP2012/075181, having a filing date of Dec. 12, 2012 which claims priority to European Patent Application 1119555.4 having a filing date of Dec. 23 2011 the entire contents of each of which are hereby incorporated by reference.

FIELD OF TECHNOLOGY

The following relates to an apparatus for completely separating from the carcass of a gutted poultry body breast fillets that have already been partially detached from the carcass, comprising a pair of separating means for separating the breast fillets hanging down on both sides of the breast bone of the carcass from the breast bone and guiding means for guiding the carcass in the direction of the two separating means arranged at a distance from one another, wherein the guiding means comprises two guiding elements lying next to one another and at a distance from one another, which between them form a gap which is directed in the transport direction T of the poultry bodies for receiving and guiding the breast bone of the carcass, and wherein the separating means enter this gap from below in such a way that the separating means for separating the breast fillets from the breast bone protrude upwards beyond the guiding means in the direction of the carcass.

BACKGROUND

Furthermore, the invention relates to a method for completely separating from the carcass of a gutted poultry body breast fillets that have already been partially detached from the carcass, in particular with an apparatus with the steps: guiding of the carcass with the already partially detached breast fillets hanging down from the breast bone of the carcass into the area of an apparatus for completely separating the breast fillets from the breast bone, threading the breast bone of the carcass between two guiding elements lying next to one another and at a distance from one another, guiding of the carcass in the direction of two separating means arranged at a distance from one another, threading of the breast bone between the separating means and complete separation of the breast fillets by means of the separating means protruding upwards out of the guiding elements.

Such apparatuses and methods are normally used in the handling and processing of animal bodies. The aforementioned apparatus is normally part of a processing apparatus for processing slaughtered animal bodies, with animal bodies understood to also include animal body parts. The processing apparatus is in particular set up for the handling and processing of poultry (e.g. chicken, turkey, etc.), namely for the filleting of breast caps or front halves. The processing apparatus, in particular for removing the meat from gutted bodies of slaughtered poultry without extremities, comprises several processing stations and tools arranged in a processing line as well as a driven, rotating conveyor with holding apparatuses arranged on it in a row along the processing line. The transport of the animal bodies through the processing apparatus and guiding the same past the processing stations and tools takes place by means of these holding apparatuses, which are also called transport saddles.

A processing apparatus or line has at least such processing stations or respectively tools by means of which the breast fillets (main fillet with or without tender fillet) are partially detached from the carcass through cutting and/or scraping so that the breast fillets are finally still fastened to the carcass or respectively connected with it in the area of the breast bone. The animal bodies saddled on the transport saddle are normally transported upside down at least in the area of the apparatus for completely separating the breast fillet such that the breast bone points downward. The transport of the animal bodies takes place in the direction of the apparatus for completely separating the breast fillets with the wishbone of the carcass in front so that the breast bone with a leading, thorn-like section reaches the apparatus for completely separating the breast fillets from the carcass. Moreover, the anatomical uniqueness thereby consists in that the breast bone of animal bodies saddled on the transport saddle runs backwards and diagonally upwards opposite the transport direction T of the animal bodies. In this position, in which the breast fillets hang down on both sides of the breast bone, the animal body reaches the apparatus for completely separating the breast fillets from the carcass, wherein the breast fillets lie against one another at least in the rear, trailing area of the breast bone under formation of a fold between the breast fillets and the breast bone.

In practice, such apparatuses are known in which the guiding means as a rigid element enables a guiding of the carcasses and the breast fillets up to the entry of the breast bone (also called the keel bone in general language use due to the keel-shaped progression of the breast bone) or respectively of the leading tip of the breast bone between the separating means. Both guiding elements forming the guiding means are distanced from one another and receive the breast bone of the carcass between each other. The breast fillets progress—with the breast bone between the guiding elements—below the guiding elements, while the remaining carcass body progresses above the guiding elements. As soon as the poultry body reaches the separating means, the breast fillets are pressed together or respectively pushed together. In other words, the simultaneous guiding and cutting of the breast fillets lead to the breast fillets being folded together. This effect is intensified—in particular due to the aforementioned anatomical uniqueness of the breast bone—starting from the leading end of the breast bone up to the trailing end. This results in cutting errors, which lead on one hand to losses in yield and on the other hand to inadequate qualities of the separated breast fillets.

SUMMARY

Thus, the object is to create an apparatus that optimises the complete removal of the breast fillets from the carcass. Furthermore, the object is to suggest a corresponding method.

This object is solved by an apparatus of the type mentioned hereinbefore such that the guiding elements are pivotable out of a guiding position forming the gap into a waiting position increasing the distance A to the separating means and vice versa and such that a spreading element for spreading the breast fillets away from the breast bone during the separating operation is provided. With this design according to the invention, it is possible to move the guiding elements apart directly after the threading of the breast bone between the two separating means. This effectively prevents the clamping of the breast fillets between the guiding elements on one side and the separating means on the other side, which leads to the formation of folds during the separating operation. In other words, a type of diversion space for the spreading apart is provided for the hanging breast fillets in order to ensure a holding or respectively spreading apart of the breast fillets from the breast bone. In other words, the folding together of the breast fillets is effectively prevented by the pivot function of the guiding elements. The spreading element according to the invention serves to actually execute the spreading movement of the breast fillets away from the breast bone in that the spreading element enters between the breast fillets and pushes them laterally outwards away from the breast bone. On the other hand, the spreading element can thereby be moved along the breast bone in order to press the two breast fillets hanging down from the breast bone to the outside over the length of the breast bone so that the breast fillets are held mainly horizontally to the side at least in the direct fastening area on the breast bone. The then engaging separating means thus do not cut into the breast fillets but rather push between the breast fillets and the breast bone into the gap formed by the spreading apart so that the breast fillets can be separated with maximum yield very close to the breast bone.

An advantageous further development of the invention is distinguished by the fact that the two guiding elements in their guiding position run parallel to one another and are pivotable laterally away from one another and towards one another in the horizontal direction around a pivot axis S running vertical to the transport plane E of the poultry bodies. A very short pivot path and a fast release of the breast fillets for the spreading apart are thus ensured by the spreading element, whereby the separating result is improved. In this case, the term transport plane is not a two-dimensional plane in the strict mathematical sense. Since the poultry bodies, the guiding elements, etc. have a certain thickness or respectively physical height, the term should only be understood in that the poultry bodies are transported parallel to the surface top side of the guiding elements.

The guiding elements in the infeed area M and/or in the discharge area N advantageously have a ramp-like chamfer. The infeed and/or discharge chamfers preferably pointed downwards simplify the controlled guiding of the breast fillets under the guiding elements as well as the insertion of the breast bone into the gap between the guiding elements.

A particularly preferred embodiment is characterised in that the guiding elements are designed in a height-adjustable manner, i.e. perpendicular to the transport plane E. This further development of the invention ensures that different separating results, namely on the one hand the separating of complete breast fillets, i.e. main fillet with tender fillet, and on the other hand the separating only of the main fillet can be achieved with the same apparatus. In the case of the separating of complete breast fillets, both the main fillet as well as the tender fillet progress below the guiding elements (so-called "tender in"), for which reason in this case the guiding elements are arranged higher than in the case of the separating only of the main fillets. In the case of the latter variant, the main fillet progresses below the guiding elements, while the tender fillet progresses above the guiding elements (so-called "tender out").

The horizontal distance A between the two guiding elements in their guiding position is preferably adjustable and is preferably 3 to 8 mm and particularly preferably 4 to 5 mm. The apparatus can be adjusted to different animal body sizes through the adjustability of the distance.

Another advantageous further development is distinguished by the fact that the separating means are rotatingly driven circular knives. Circular knives are particularly suitable for separating the existing connection between the breast fillets and the breast bone, which normally consists of a narrow ligament of meat and/or tissue, without damaging the breast fillets.

The circular knives are advantageously arranged at a distance from one another forming a distance B between one another and are driven following the transport direction T of the poultry bodies. In particular, the drive moving along, i.e. the drive, in which the cutting forces act at least partially in transport direction T, quasi supports the poultry body or respectively the breast fillets hanging from the carcass during transport through the apparatus.

It is advantageous that the distance A between the two guiding elements corresponds at most to the distance B between the two separating means. The threading of the breast bone between the two separating means is thereby simplified and in particular the "transfer" of the animal body from the guiding elements to the separating elements is facilitated.

A particularly preferred embodiment is characterised in that the separating means are designed to be moveable up and down with respect to the transport plane E. It is thus ensured that the separating means only protrude out of the guiding elements when the actual separating operation of the breast fillets from the carcass begins. In other words, the separating means during the infeed of the poultry bodies into the separating means are still retracted under the guiding elements so that areas of the carcass leading before the breast bone, in particular the wishbone, are not destroyed. In other words, the maneuverability of the separating means enables the diversion of the same from areas, which should not or must not come in contact with the separating means.

For executing the up and down movement the separating means are advantageously pivotable in a cam-controlled manner around a pivot point. Such up and down movements are particularly easy to control by means of the cam control. The cam control enables the stable and precise controlling of the separating means for fast control movements as occur in the apparatus according to the invention since the processing cycles of the apparatus only take a few seconds or less per poultry body/carcass.

In a particularly preferred embodiment of the invention, the spreading element is a stationary spreading lever pivotable around a pivot axis P, which is arranged in transport direction T of the poultry bodies in the area of in-feed of the poultry bodies into the separating means. This embodiment ensures that the spreading element can work together with the guiding elements in an optimal manner. The arrangement enables an exact coordination of the opening of the guiding elements on the one hand and the entry of the spreading element on the other hand, whereby optimal separating results are achieved.

Advantageously, the pivot axis P of the spreading lever lies below the guiding elements, wherein in the actuation-free state a free end of the spreading lever protrudes out of the guiding means upwards in the direction of the carcass, while the opposite free end of the spreading lever is pushed against an abutment by means of a spring element. It is thereby ensured in an easy and secure manner that the poultry bodies entering the apparatus come in contact with the spreading lever. It is ensured by the design according to the invention that the spreading lever with the free end pointing upwards in the direction of the carcass follows the contour of the breast bone so that the spreading apart of the breast fillets is ensured in order to avoid the formation of folds in particular in the rear, trailing area of the breast bone.

The free end of the spreading lever pointing upwards in the direction of the carcass, namely a spreading finger, preferably lies between the two separating means. On the one hand, it is thereby achieved that the breast fillets are already spread open by the separating means at the first cut, i.e. at the first contact of the separating means with the breast fillets. The stepped design of the spreading lever also offers edge protection for the separating means. In other words, a ledge is formed in the spreading lever by the spreading finger designed narrower than the base, whereby the wider base of the spreading lever forms a type of cover for the separating means. This cover protects sections of the breast fillets hanging down from the breast bone from contact with the separating means.

In a particularly advantageous further development of the invention, a plate-like protection element is arranged between the two separating means, which protrudes from the separating means in transport direction T of the poultry bodies in the area of in-feed of the poultry bodies into the separating means into an area lying below the guiding means. A type of cover for the separating means is thereby also formed. However, this cover lies below the cover formed by the spreading lever so that the separating means in the infeed area M below the guiding elements are covered as completely as possible in order to also reduce in particular the risk of injury to the operating personnel.

Advantageously, a deflector is assigned to the two separating means, which at least partially covers the cutting edges of the separating means in transport direction T of the poultry bodies in the area M of in-feed of the poultry bodies into the separating means below the guiding elements and above the spreading element. This protective cover ensures additional safety for one for the operating personnel and also for the hanging breast fillets.

Another advantageous embodiment of the invention is characterised in that a guide element is attached to the guiding means in the discharge area N, wherein the guide element lies below the guiding means and is designed in a movable manner. The separated breast fillets are to be guided inevitably and reliably out of the apparatus by means of the guide element. This means that the guide elements effectively inhibit the further transport of the breast fillet. Through the maneuverability of the guide elements, the discharge area N of the apparatus, i.e. the area directly behind the separating means, is completely released so that even those products or product parts that get caught or stuck in the apparatus fall out of the apparatus.

The aforementioned embodiment is preferably further characterised in that the guide element consists of two partial elements, wherein each partial element is pivotable around a horizontal pivot axis W. This embodiment enables the quick and reliable opening of the guide element for the discharging of the separated breast fillets.

The object is also solved through a method with the initially named steps such that the guiding elements with or after entry of the breast bone between the separating means are pivoted apart laterally and the breast fillets are spread apart during the separating operation from the breast bone. The resulting advantages have already been explained in connection with the apparatus, which is why the corresponding passages are referenced in order to avoid repetitions.

BRIEF DESCRIPTION

Figure 2:
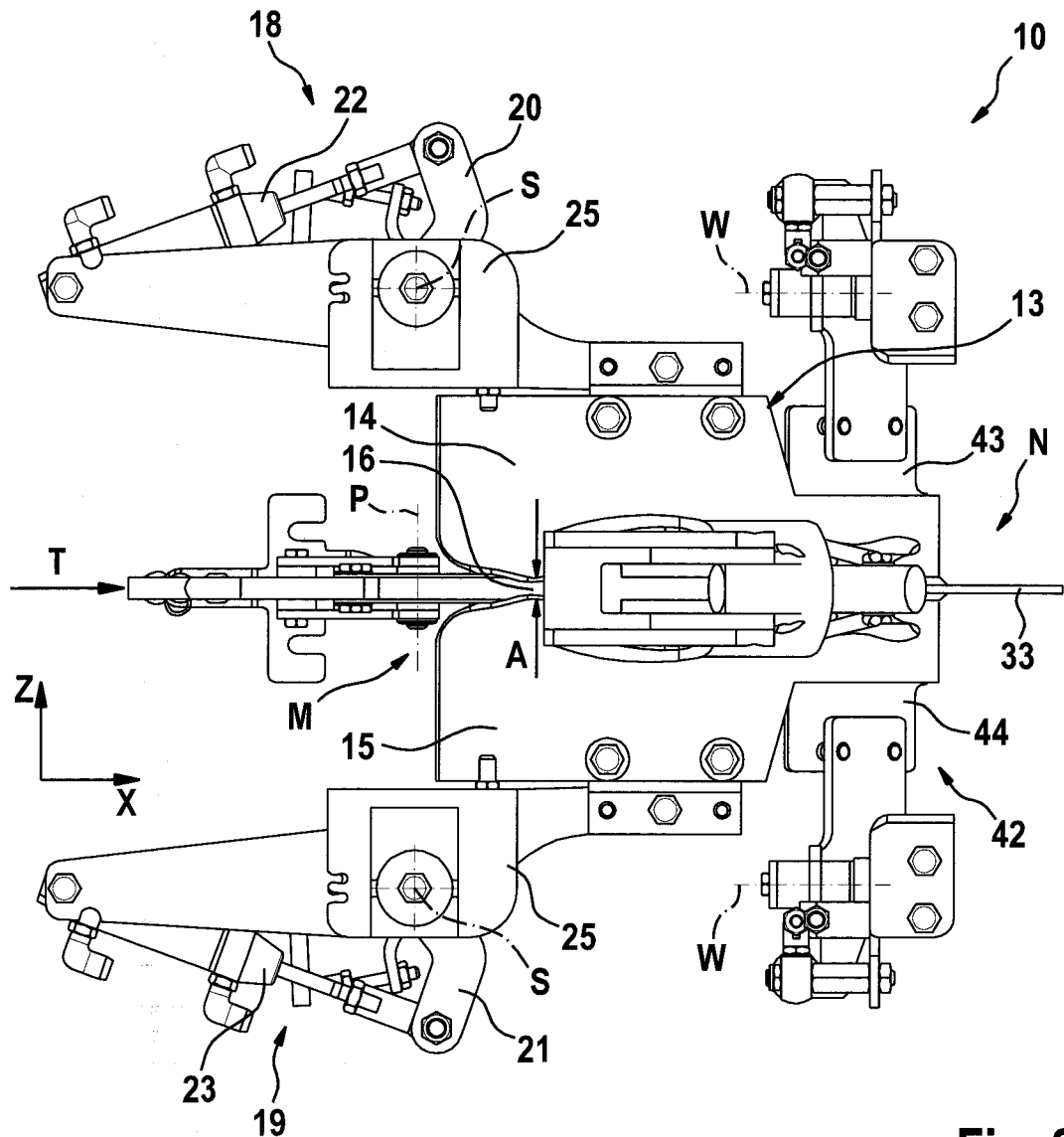
Figure 3:
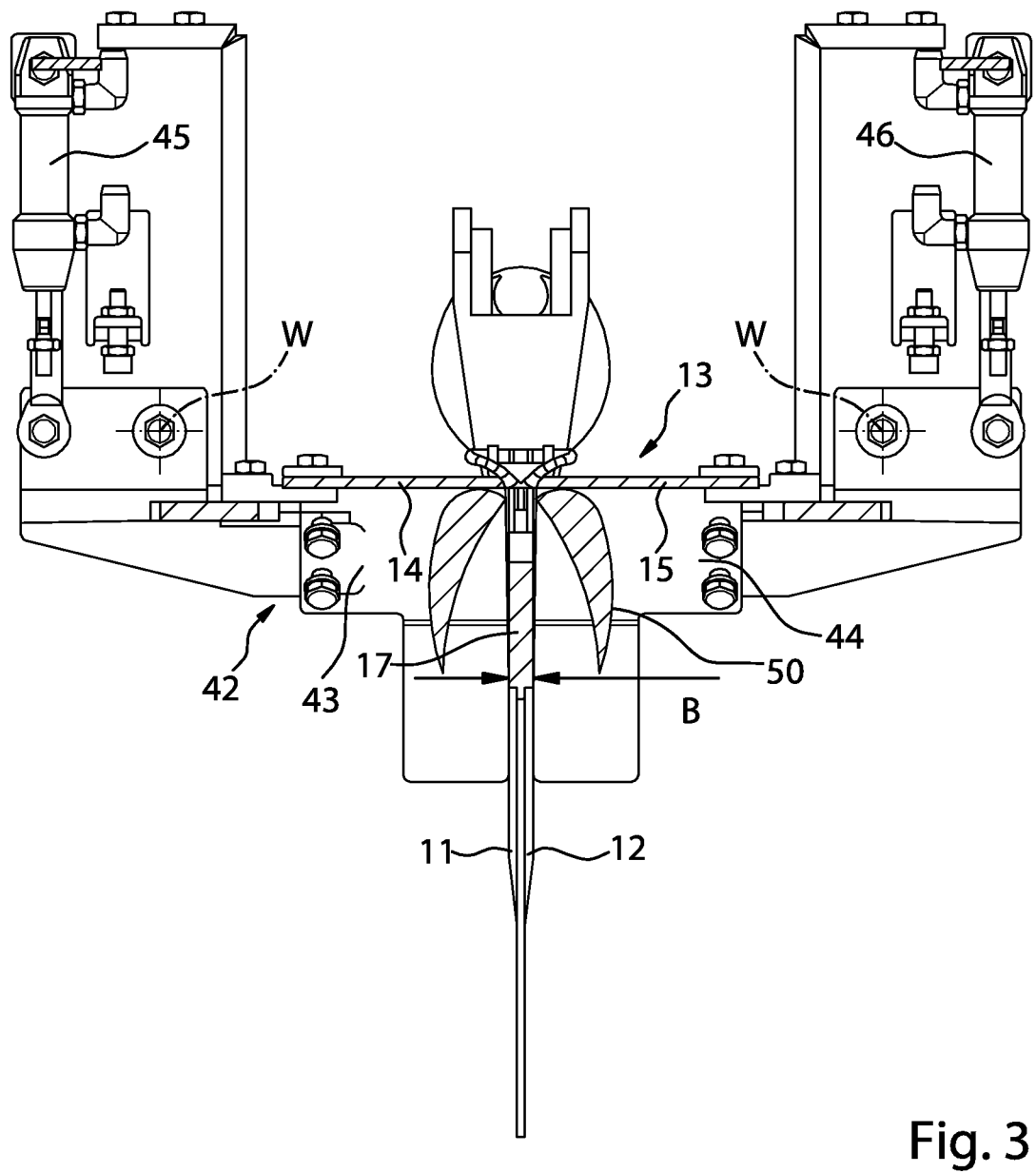
Figure 4:
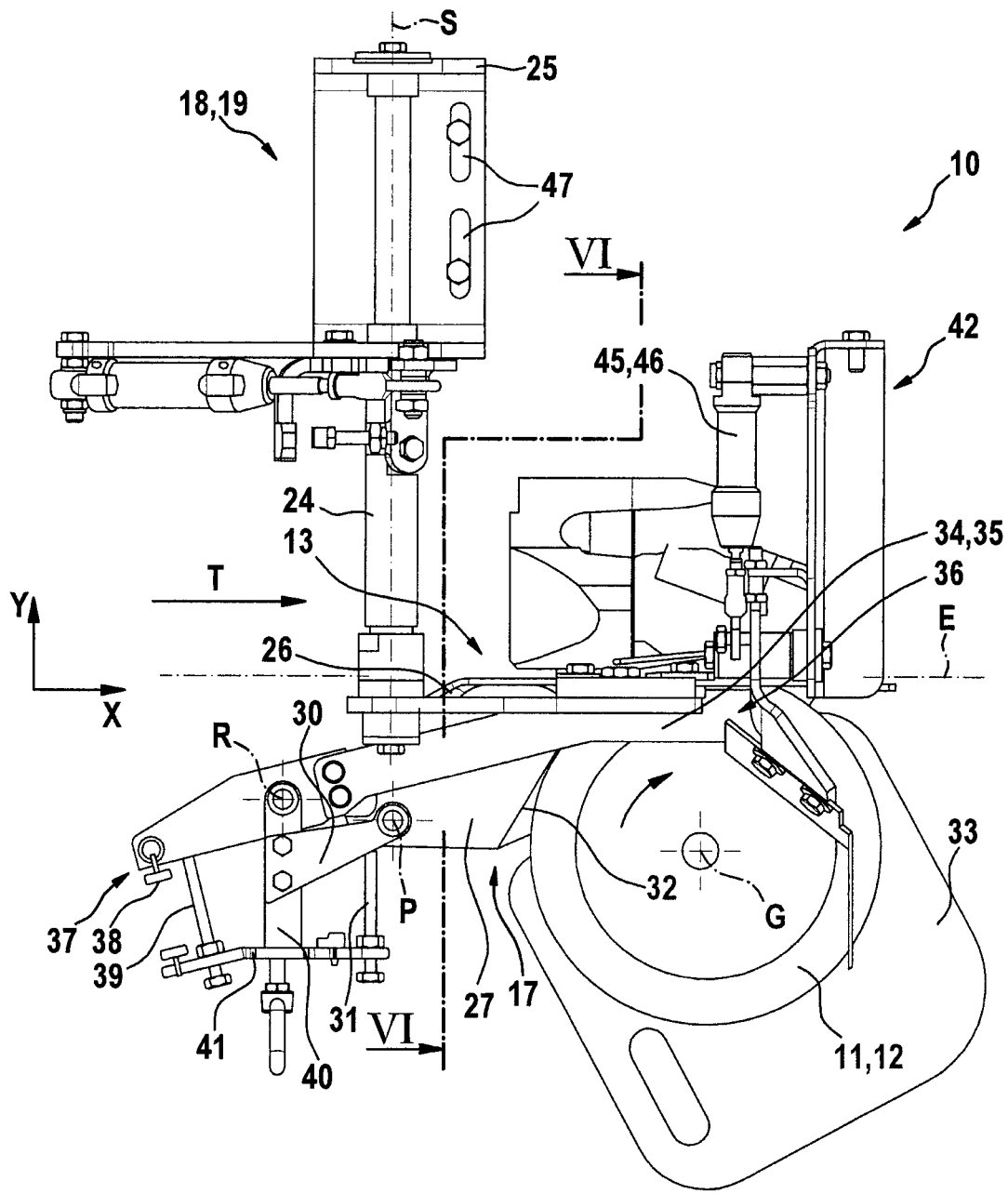
Figure 5:
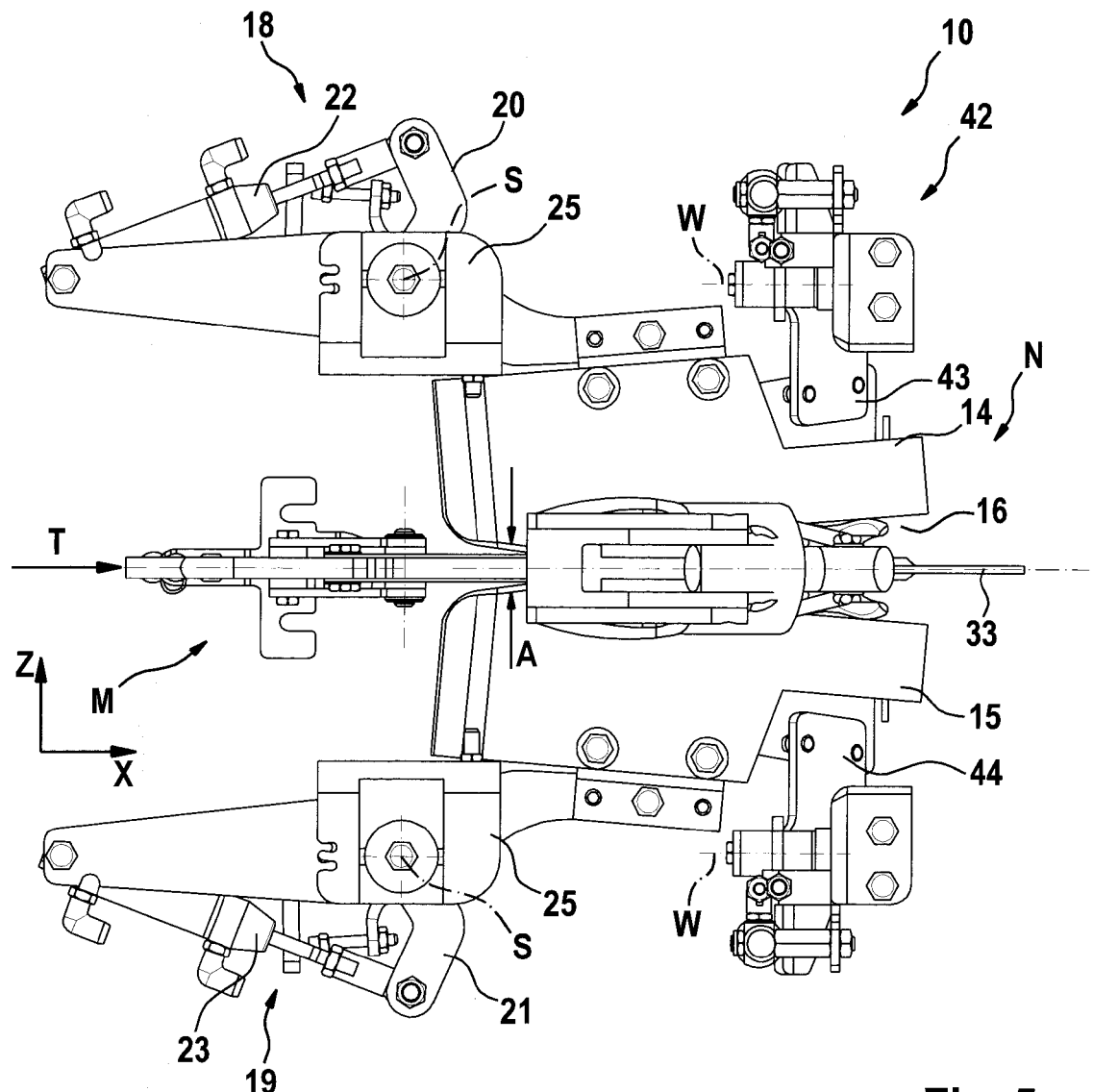

Some of the embodiments will be described in detail, with reference to the following figures, wherein like designations denote like members, wherein:

FIG. 1 a schematic representation of the apparatus in a side view with the guiding elements in a closed guiding position;

FIG. 2 a top view of the apparatus according to FIG. 1;

FIG. 3 a representation of the apparatus according to FIG. 1 along the cut III-III;

FIG. 4 a schematic representation of the apparatus in a side view with the guiding elements in an open waiting position;

FIG. 5 a top view of the apparatus according to FIG. 4; and

Figure 6:
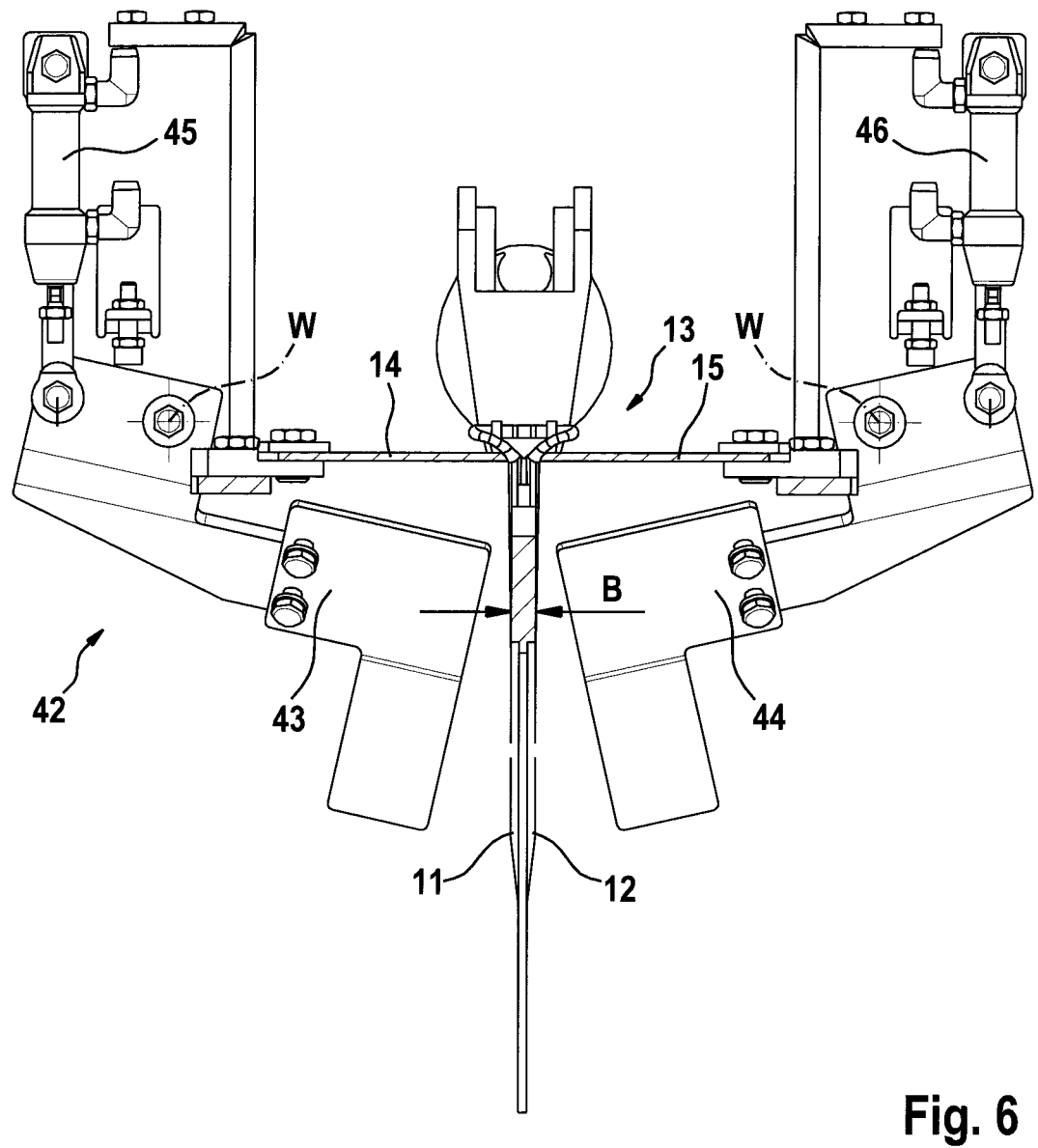

FIG. 6 a representation of the apparatus according to FIG. 4 along the cut VI-VI.

DETAILED DESCRIPTION

The invention concerns an apparatus for completely separating from the carcass of a gutted poultry body breast fillets that have already been partially detached from the carcass. The described embodiments concern as examples the filleting of breast caps of a chicken. Of course, the apparatus according to the invention is also designed and set up for the filleting of breast caps/front halves of other poultry bodies.

The apparatus 10 represented in the figures for completely separating from the carcass of a gutted poultry body breast fillets 50 that have already been partially detached from the carcass comprises a pair of separating means 11, 12 for separating the breast fillets hanging down on both sides of the breast bone of the carcass from the breast bone and guiding means 13 for guiding the carcass in the direction of the two separating means 11, 12 arranged at a distance from one another. The guiding means 13 comprises two guiding elements 14, 15 lying next to one another and at a distance from one another, which between them form a gap 16 which is directed in the transport direction T of the poultry bodies for receiving and guiding the breast bone of the carcass. The separating means 11, 12 enter this gap 16 in such a way that the separating means 11, 12 for separating the breast fillets from the breast bone protrude upwards beyond the guiding means 13 in the direction of the carcass. This means that the breast bone lies both between the guiding elements 14, 15 and between the separating means 11, 12 during the separating operation, while the separating means 11, 12 execute the separating cut protruding upwards beyond the guiding means 13.

Such an apparatus 10, which is normally fastened on a frame, a support or a housing of a processing apparatus, is characterised according to the invention in that the guiding elements 14, 15 are pivotable out of a guiding position (see in particular FIG. 2) forming the gap 16 into a waiting position (see in particular FIG. 5) enlarging the distance A to the separating means 11, 12 and vice versa and in that a spreading element 17 for spreading the breast fillets away from the breast bone during the separating operation is provided. Through the combination of the manoeuvrability of the guiding elements 14, 15 on one side and the spreading elements 17 on the other side, it is possible to optimally detach the breast fillets from the breast bone. For entry of the carcass into the apparatus 10 or more precisely for the threading of the breast bone between the guiding elements 14, 15, these are located in the guiding position. With the threading of the breast bone between the separating means 11, 12 or directly thereafter, the guiding elements 14, 15 are then located in the waiting position in which the gap 16 is enlarged with respect to the guiding position. The spreading element 17 thus has sufficient roomspace available for spreading or respectively holding the breast fillets away from the breast bone. Due to the fact that the breast fillets at least in the area of their fastening on the breast bone are held pushed into an approximately horizontal alignment by the spreading element 17, the separating means 11, 12 in the immediate vicinity of the breast bone, which progresses approximately parallel to the separating means 11, 12 and between them, separate the meat and/or tissue connection between the breast fillet and the breast bone. A pushing together of the breast fillets or the folding open of the breast fillets during the separating operation is thereby effectively prevented.

The features and further developments described below represent separately or in combination with each other preferred embodiments of the invention.

In a preferred embodiment, in their guiding position the two guiding elements 14, 15 run parallel to one another and are pivotable away from each other or towards each other laterally in the horizontal direction around a pivot axis S running vertically to the transport plane E (X-Z plane in FIG. 2) of the poultry bodies. In the shown embodiment, these two pivot elements or respectively guiding elements 14, 15 actuatable together or individually and preferably synchronously are simple guide plates or the like, which are arranged on a pivot mechanism 18, 19. The pivot mechanism 18, 19 comprises among other things a pivot lever 20, 21, on which the guiding elements 14, 15 are fastened. The pivot levers 20, 21 are rotatable via a shaft 24, which forms the pivot axis S, by means of an actuation element 22, 23, for example a pneumatic cylinder, around the pivot axis S relative to a supporting body 25 for achieving a pivot movement of the guiding elements 14, 15. In alternative embodiments, other normal adjustment or pivot mechanisms can naturally be used. Linearly adjustable guiding elements 14, 15 can also be used.

The guiding elements 14, 15 have on the input side, i.e. in the infeed area M, and/or on the output side, i.e. in the discharge area N, a ramp-like chamfer 26. This chamfer 26 preferably pointing downwards with respect to the transport plane E is preferably only designed on the input side and serves to facilitate the running on of the carcass onto the guiding elements 14, 15 on one hand and on the other hand to guide the pre-detached breast fillets hanging down from the carcass or, more precisely, the breast bone under the guiding elements 14, 15, while the carcass is guided above the guiding elements 14, 15 with the breast bone between the guiding elements 14, 15. The guiding elements 14, 15 optionally have an insertion aid in the infeed area M. This is formed e.g. by an expanding progression of the guiding elements 14, 15 starting from the gap 16 opposite the transport direction T. This insertion aid facilitates in particular the threading of the breast bone between the guiding elements 14, 15.

The guiding elements 14, 15 are optionally designed adjustable in height, i.e. perpendicular to the transport plane E. This adjustment can take place e.g. by replacing or adjusting the supporting body 25. It is also possible to design the shaft 24 telescopically. Simple mechanical solutions, for example through use of spacers or the like, are also possible for height adjustment. Another option for the vertical adjustment of the guiding elements 14, 15 can be formed through the adjustment of the entire pivot mechanism 18, 19, e.g. via elongated holes 47 in a housing wall of the processing apparatus. Different separating results can be achieved by means of the adjustment option. In a lower position of the guiding elements 14, 15, a separating cut takes place by means of the separating means 11, 12 exclusively for the main fillets, since the tender fillets are guided above the guiding elements 14, 15. If the guiding elements 14, 15 are located in an upper position, the tender fillets are guided below the guiding elements 14, 15 just like the main fillets and are accordingly separated by the separating means 11, 12. Besides the adjustment of the height of the guiding elements 14, 15, the horizontal distance A of the two guiding elements 14, 15 in their guiding position, i.e. the width of the gap 16, is also optionally adjustable. The gap width is preferably 3 to 8 mm and particularly preferably 4 to 5 mm. Through the adjustability of the gap width, the apparatus 10 is adjustable to different sizes of poultry bodies with a correspondingly broader breast bone.

The separating means 11, 12 can be stationary or moving blades, burins or other sharp-edged separating elements. In the preferred embodiment, the separating means 11, 12 are however rotatingly driven circular knives. These circular knives, which are preferably driven following the transport direction T around a horizontally running rotational axis G, which is aligned parallel to the transport plane E, are arranged parallel to one another and form between one another a distance B. This distance B is adjustable. The distance A between the two guiding elements 14, 15 preferably corresponds to the distance B between the two circular knives. The distances A and B can however also be different from one another, wherein it is preferable in this case that the distance A is slightly smaller than the distance B.

In a preferred further development of the invention, the separating means 11, 12 are designed to be moveable up and down with respect to the transport plane E. This means that the position of the separating means 11, 12 with respect to the transport plane E is variable. If the separating means 11, 12 were to protrude lastingly and permanently upwards out of the guiding means 13, there would be the risk of collision between the separating means 11, 12 on the one hand and the carcass and in particular the preceding wishbone on the other hand. For this reason, the separating means 11, 12 protrude upwards out of the guiding means 13 only during the separating operation. Before and after the separating operation, the separating means 11, 12 are located in a deeper position such that contact with the carcass is excluded. The separating means 11, 12 are preferably retracted behind the guiding means 13 with the exception of the separating operation, so that the separating means 11, 12 no longer protrude beyond the guiding means 13. Normal measures are suitable for controlling this adjustment movement. Particularly preferred is an embodiment in which the separating means 11, 12 are controllable in a cam-controlled manner for executing the up and down movement around a pivot point. However it is also possible that the separating means 11, 12 are designed motor-driven e.g. clocked in a linear movement and/or moveable up and down cyclically. But other options for adjusting the separating means 11, 12, for example by means of pneumatic control elements, can also be used. A further development provides that the separating means 11, 12 can be deflectable against a spring force.

As already mentioned, the spreading element 17 is a central component of the invention. The spreading element 17 is preferably a stationary spreading lever 27 pivotable around a pivot axis P, which is arranged in transport direction T of the poultry bodies in the area M of in-feed of the poultry bodies into the separating means 11, 12. In other words, the poultry body comes into contact with the spreading lever 27 during infeed into the apparatus 10 before the separating elements 11, 12 come into contact with the breast fillets. For this, the pivot axis P of the spreading lever 27 lies below the guiding elements 14, 15, wherein in the actuation-free state, i.e. when there is no poultry body in the apparatus 10, a free end 28 of the spreading lever 27 protrudes out of the guiding means 13 upwards in the direction of the carcass, while the opposite free end 29 of the spreading lever 27 is pushed against an abutment 31 by means of a spring element 30. As soon as a poultry body or respectively a carcass comes in contact with the free end 28 of the spreading lever 27, it is pushed downwards through the carcass against the spring force of the spring element 30 so that the opposite free end 29 is released from the abutment 31. As long as the carcass is located in the apparatus 10, the free end 28 of the spreading lever 27 moves under lateral spreading apart of the two breast fillets hanging down laterally from the carcass along the contour or respectively the progression of the breast bone.

The free end 28 of the spreading lever 27 pointing upwards towards the carcass, which is designed as a spreading finger, lies between the separating means 11, 12. The width of the spreading finger is thus less than the distance B between the two separating means 11, 12. However, it is preferred if the width of the spreading finger is only slightly smaller than the distance B so that the spreading finger forms the largest possible abutment face on the carcass or respectively the breast bone. The spreading finger can be designed in a flat manner on the side facing the breast bone. Alternatively, the spreading finger with its contact surface can also be adjusted for the contour of the breast bone, whereby in addition to the spreading function for the breast fillets a guiding function is simultaneously formed for the breast bone and thus for the carcass.

Hence, due to the selected width, the spreading lever 27 protrudes with the spreading finger between the separating means 11, 12. Through a narrower design of the spreading finger with respect to the base body of the spreading lever 27, a ledge 32 can be formed so that the thicker section of the spreading lever 27 forms a type of cover for the separating means 11, 12. Due to the fact that the ledge 32 covers the sharp edges of the separating means 11, 12 in the transport direction T, the incoming poultry bodies and in particular the breast fillets hanging down from the carcass or respectively the breast bone are protected from damage. The ledge 32 simultaneously forms a protection for the operating personnel.

The spreading element 17 can also be designed in a different manner. For example, it is possible that the spreading element 17 is a spreading fork arranged in transport direction T in front of the separating means 11, 12, by means of which the breast fillets can be pressed apart. The spreading element can also be a die-like component, which can be brought from a pulled-back position into a spreading position and vice versa.

In another advantageous further development, a plate-like protection element 33 can be arranged between the separating means 11, 12, which protrudes from the separating means 11, 12 in transporting direction T of the poultry bodies in the area M of in-feed of the poultry bodies into the separating means 11, 12 in an area lying below the guiding means 13. The protection element 33, which can e.g. be mounted on the rotational axis G of the circular knives, protrudes from the separating means 11, 12 with one edge counter to the transport direction Transport, so that incoming poultry bodies or respectively their hanging breast fillets only hit, if anything, the protection element 33. But above all, this protection element 33 serves to protect the operating personnel since the sharp separating edges of the separating means 11, 12 are protected. The protection element 33 or respectively the section of the protection element 33 protruding out of the separating means 11, 12 is arranged below the spreading element 17.

A deflector 34, 35 is preferably assigned to both separating means 11, 12, which at least partially covers the cutting edges of the separating means 11, 12 in transport direction T of the poultry bodies in the area M of in-feed of the poultry bodies into the separating means 11, 12 below the guiding elements 14, 15 and above the spreading element 17. The cutting edges of the separating means 11, 12 are even better secured by this design. The deflectors 34, 35 are preferably designed to correspond with the spreading element 17, in that the deflectors 34, 35 are stationary pivot levers pivotable around a pivot axis R, which are arranged in transport direction T of the poultry bodies in the area M of in-feed of the poultry bodies into the separating means 11, 12. A free end 36 of the pivot lever covers the cutting edges of the separating means 11, 12, while the opposite free end 37 is pushed against an abutment 39 by means of a spring element 38.

In the preferred embodiment shown in the figures, the spreading element 17 and the deflectors 34, 35 form one structural unit. More precisely, the spreading element 17 and the deflectors 34, 35 are arranged on a common carrier 40, which is fastened on a machine frame, support or the like. A supporting body 41, to which the abutments 31, 39 are attached, is arranged on the carrier 40. The abutments 31, 39 are preferably adjusting screws or the like. The position of the abutments 31, 39 is thereby adjustable. But the spreading element 17 and the deflectors 34, 35 can also be designed and arranged separately from one another. In the described embodiment, both the spreading element 17 as well as the deflectors are deflectable and controllable by the poultry bodies themselves. Otherwise, there is also the option of actively controlling the spreading element 17 and the deflectors 34, 35 through other actuation members.

Optionally, a guide element 42 is assigned to the guiding means 13 in the discharge area N, wherein the guide element 42 lies below the guiding means 13 and is designed in a movable manner. The guide element 42, which preferably consists of two partial elements 43, 44, wherein each partial element 43, 44 is pivotable around a horizontal pivot axis W, serves to reliably guide the detached breast fillets out of the apparatus 10. For this, the partial elements 43, 44 are designed bent or respectively creased in that the partial elements 43, 44 are pointed first with respect to the transport plane E diagonally downwards and then vertically downwards. The sections of the partial elements 43, 44 pointed vertically downwards thereby serve as a type of baffle plate, which prevent an undesired continuation of the separated breast fillets. The pivotability of the partial elements 43, 44 around the pivot axes W, which run parallel to the transport plane E, is triggerable by actuation members 45, 46. In the described embodiment, the actuation members 45, 46 are pneumatic cylinders.

The described apparatus 10 can comprise a central control unit and several individual control units that communicate with each other. In other words, the setting and adjustment options described above as well as the drives can be coordinated with each other so that a collision-free separating operation or respectively separating cycle adjusted for the size of the poultry bodies can be performed.

Below, the preferred method principle will be explained in greater detail based on the attached drawing and a single poultry body or respectively a single carcass saddled on a holding apparatus:

The carcass is transported with the wishbone preceding and the breast bone pointed downwards in the direction of the apparatus 10. Before the carcass reaches the apparatus 10, the free end 28 of the spreading lever 27 protrudes upwards beyond the guiding elements 14, 15. Through the continuous transport of the carcass in transport direction T, the carcass with the breast bone, or respectively its leading, thorn-like section, threads between the guiding elements 14, 15. The carcass body itself is thereby transported above the guiding elements 14, 15, while the breast fillets hanging down from the breast bone are transported below the guiding elements 14, 15. This case occurs when the entire breast fillets, i.e. main fillet and tender fillet, need to be separated from the carcass. If only the main fillet needs to be separated, a type of setting the course occurs with respect to the guiding in the infeed area M into the guiding elements 14, 15, in that the main fillets are transported below the guiding elements 14, 15, while the tender fillets are transported above the guiding elements 14, 15.

With the increasing transport of the carcass in transport direction T, the carcass with its breast bone hits the spreading element 17 protruding upwards out of the guiding elements 14, 15. More precisely, the breast bone comes in contact with the spreading finger of the spreading lever 27 before the carcass reaches the separating means 11, 12. The spreading lever 27 is pushed downwards by the carcass against the force of a spring. The spreading lever 27 thereby pushes from below against the breast bone during the transport of the carcass through the apparatus 10 and follows its contour so that the spreading lever 27 spreads the breast fillets hanging down from the carcass or respectively more precisely from the breast bone laterally apart away from the breast bone.

As mentioned, the breast bone is guided in the direction of the separating means 11, 12 between the guiding elements 14, 15 in the gap 16. When the breast bone reaches the separating means 11, 12 or immediately after the breast bone reaches the separating means 11, 12, the guiding elements 14, 15 pivot apart laterally. In other words, the guiding elements 14, 15 with or after entry or respectively threading of the breast bone between the separating means 11, 12 are pivoted out of their guiding position around the pivot axis S laterally into a waiting position. In the waiting position, the distance A between the guiding elements 14, 15 is greater than in the guiding position. With this pivoting upwards, the spreading element 17 is given the possibility of being guided along the breast bone during the spreading apart of the breast fillets, as described further above.

After the carcass with its leading section, namely the wishbone, has passed the separating means 11, 12 in transport direction T, the separating means 11, 12 are moved from a retracted position, in which they let the carcass with the preceding wishbone pass collision-free, upwards into the separating position, in which the separating means 11, 12 protrude upwards out of the guiding elements 14, 15. With the separating means 11, 12, the breast fillets on both sides of the breast bone are separated from the carcass. For this, the separating means 11, 12 enter the space between the breast fillets, on the one hand, and the breast bone, on the other hand, created by the spreading element 17 immediately next to the breast bone. The separating means 11, 12 then descend again in order to provide the next carcass with collision-free access to the apparatus 10.

After completion of the complete separating cycle, the guiding elements 14, 15 are pivoted back into their guiding position to receive a subsequent carcass.

The separated breast fillets optionally run in discharge area N against the guide element 42. At the latest after completion of the separating operation, the partial elements 43, 44 forming the guide element 42 can be pivoted away downwards around the pivot axis W, whereby the area between the partial elements 43, 44 and the separating means 11, 12 is released (see FIGS. 3 and 6) so that the breast fillets fall down out of the apparatus 10. Before a subsequent carcass reaches the guide element 42, the partial elements 43, 44 are pivoted back into their locked position.

The invention claimed is:

1. An apparatus for completely separating from the carcass of a gutted poultry body breast fillets that have already been partially detached from the carcass, comprising a pair of separating means for separating the breast fillets hanging down on both sides of the breast bone of the carcass from the breast bone as well as guiding means for guiding the carcass in the direction of the two separating means arranged at a distance from one another, wherein the guiding means comprises two guiding elements lying next to one another and at a distance from one another, which between them form a gap which is directed in the transport direction T of the poultry bodies for receiving and guiding the breast bone of the carcass, and wherein the separating means enter this gap from below in such a way that the separating means for separating the breast fillets from the breast bone protrude upwards beyond the guiding means in the direction of the carcass, characterised in that the guiding elements are pivotable out of a guiding position forming the gap into a waiting position increasing the distance A to the separating means and vice versa and in that a spreading element for spreading the breast fillets away from the breast bone during the separating operation is provided.

2. The apparatus according to claim 1, wherein the two guiding elements in their guiding position run parallel to one another and are pivotable laterally away from one another and towards one another in the horizontal direction around a pivot axis S running vertical to the transport plane E of the poultry bodies.

3. The apparatus according to claim 1, wherein the guiding elements in an infeed area M and/or in a discharge area N have a ramp-like chamfer.

4. The apparatus according to claim 1, wherein the guiding elements are designed in a height-adjustable manner perpendicular to the transport plane E.

5. The apparatus according to claim 1, wherein a distance A between the two guiding elements is adjustable in their guiding position and is between 3 to 8 mm.

6. The apparatus according to claim 1, wherein the separating means are rotatingly driven circular knives.

7. The apparatus according to claim 6, wherein the two circular knives are arranged at a distance from one another forming a distance B between one another and are driven following the transport direction T of the poultry bodies.

8. The apparatus according to claim 7, wherein the distance A between the two guiding elements corresponds at most to the distance B between the two circular knives.

9. The apparatus according to claim 1, wherein the guiding elements are designed to be moveable in an up and down manner with respect to the transport plane E.

10. The apparatus according to claim 9, wherein the separating means are pivotable in a cam-controlled manner around a pivot point in order to execute the up and down movement.

11. The apparatus according to claim 1, wherein the spreading element is a stationary spreading lever pivotable around a pivot axis P, which is arranged in transport direction T of the poultry bodies in an area M of in-feed of the poultry bodies into the separating means.

12. The apparatus according to claim 11, wherein the pivot axis P of the spreading lever lies below the guiding elements, wherein in the actuation-free state a free end of the spreading lever protrudes upwards in the direction of the carcass out of the guiding means, while the opposite free end of the spreading lever is pushed against an abutment by a spring element.

13. The apparatus according to claim 12, wherein the free end of the spreading lever, namely a spreading finger, pointing upwards in the direction of the carcass lies between the two separating means.

14. The apparatus according to claim 1, wherein a plate-like protection element is arranged between the two separating means, which protrudes from the separating means in transport direction T of the poultry bodies in an area M of in-feed of the poultry bodies into the separating means into an area lying below the guiding means.

15. The apparatus according to claim 1, wherein a deflector is assigned to both separating means, which at least partially covers the cutting edges of the separating means in transport direction T of the poultry bodies in the area M of in-feed of the poultry bodies into the separating means below the guiding elements.

16. The apparatus according to claim 1, wherein a guide element is assigned to the guiding means in a discharge area N, wherein the guide element lies below the guiding means and is designed in a movable manner.

17. The apparatus according to claim 16, wherein the guide element consists of two partial elements, wherein each partial element is pivotable around a horizontal pivot axis W.

18. The method for completely separating from the carcass of a gutted poultry body breast fillets that have already been partially detached from the carcass, in particular with an apparatus according to claim 1 with the steps:

guiding of the carcass with the already partially detached breast fillets hanging down from the breast bone of the carcass into the area of an apparatus for completely separating the breast fillets from the breast bone, threading the breast bone of the carcass between two guiding elements lying next to one another and at a distance from one another, guiding of the carcass in the direction of two separating means arranged at a distance from one another, threading of the breast bone between the separating means and complete separation of the breast fillets by means of the separating means protruding upwards out of the guiding elements, wherein the guiding elements with or after entry of the breast bone between the separating means are pivoted apart laterally and the breast fillets are spread apart during the separating operation from the breast bone.

19. The method according to claim 18, wherein the guiding elements are pivoted around a pivot axis S and a spreading element is guided for spreading apart the breast fillets during the separating operation along the contour of the breast bone.

20. The method according to claim 18, wherein the spreading element is controlled by the carcass.

* * * * *